(12) United States Patent
Lesk

(10) Patent No.: US 7,249,073 B1
(45) Date of Patent: Jul. 24, 2007

(54) METHODS AND APPARATUS FOR A PERSONAL FINANCIAL SERVICE PROVIDER

(75) Inventor: Brian D. Lesk, Scottsdale, AZ (US)

(73) Assignee: Diversified Human Resources, Inc., Scottsdale, AZ (US)

( * ) Notice: Subject to any disclaimer, the term of this patent is extended or adjusted under 35 U.S.C. 154(b) by 512 days.

(21) Appl. No.: 09/648,575

(22) Filed: Aug. 25, 2000

Related U.S. Application Data

(60) Provisional application No. 60/151,245, filed on Aug. 27, 1999.

(51) Int. Cl.
*G06Q 40/00* (2006.01)
(52) U.S. Cl. .............................. 705/32; 705/30; 705/31; 705/33; 705/34; 705/40
(58) Field of Classification Search ................. 705/35, 705/39, 40, 42, 43, 26, 27, 32, 30, 31, 33, 705/34; 379/144; 235/379, 380, 381
See application file for complete search history.

(56) References Cited

U.S. PATENT DOCUMENTS

| | | | |
|---|---|---|---|
| 5,221,838 A * | 6/1993 | Gutman et al. ............. 235/379 |
| 5,866,889 A * | 2/1999 | Weiss et al. ................ 235/379 |
| 5,978,780 A | 11/1999 | Watson ........................ 705/40 |
| 6,128,603 A | 10/2000 | Dent et al. .................... 705/40 |
| 6,173,272 B1 * | 1/2001 | Thomas et al. ............... 705/42 |
| 6,182,052 B1 * | 1/2001 | Fulton et al. ................ 705/26 |
| 6,347,306 B1 * | 2/2002 | Swart .......................... 705/32 |
| 6,424,706 B1 * | 7/2002 | Katz et al. ............. 379/144.01 |
| 6,505,250 B2 * | 1/2003 | Freund et al. .............. 709/226 |

* cited by examiner

*Primary Examiner*—Nga Nguyen
(74) *Attorney, Agent, or Firm*—Snell & Wilmer L.L.P.

(57) ABSTRACT

Systems are provided for administering employee funds and transactions utilizing a personal financial service provider system which allows comprehensive administration of employee accounts. A system for administering employee funds includes a worksite employer having a number of employees associated therewith; at least one access point configured to interface with the employees; and a personal financial service provider configured to communicate with the worksite employer and the access points, the personal financial service provider including a data center configured to store financial data associated with employees, wherein the personal financial service provider is configured to receive funds directly from the worksite employer and to disburse the funds to third parties prior to allowing the employee to disburse the funds.

4 Claims, 7 Drawing Sheets

METHODS AND APPARATUS FOR A PERSONAL FINANCIAL SERVICE PROVIDER

CROSS-REFERENCE TO RELATED APPLICATIONS

This application claims the benefit of U.S. Provisional Application Ser. No. 60/151,245, filed Aug. 27, 1999, hereby incorporated by reference.

BACKGROUND OF THE INVENTION

1. Technical Field

The present invention relates, generally, to methods of administering employee funds and transactions and, more particularly, to a personal financial service provider system which allows comprehensive administration of employee accounts.

2. Background

Although credit unions, banks, and the like often provide members with loan services and the ability to schedule automated payments—sometimes with on-line access—the traditional credit union does not have access to the funds prior to being deposited in the member's credit/savings account, and is therefore limited with respect to the services it can ultimately provide. As a result, such banks and credit units are unsatisfactory to a number of users. For example, there remains a large group of "self-banked" individuals who use non-traditional banking outlets for managing funds, i.e., check-cashing facilities and the like. In addition, many white-collar workers desire more sophisticated methods for accessing and investing their funds, and many blue-collar workers desire access to credit facilities with lower costs.

In order to simplify management of certain employee-related functions, many employers are turning to Professional Employer Organizations (PEO). In general, a PEO is a company that provides integrated business services designed to cost-effectively manage critical human resource responsibilities and employer risks for its clients. PEOs deliver these services by establishing and maintaining an employer relationship with employees assigned to their clients by contractually assuming substantial employer rights, responsibilities, and risks.

Traditional PEOs receive gross payroll (and fees) from the worksite employer and, after paying taxes, withholding, and the like, provide the net payroll amount to the worksite employer's employees. Known PEO systems, while providing useful services to its contracting employers, have nevertheless failed to address the needs of the employees with which it interfaces.

Systems are therefore needed for overcoming the limitations of the prior art. More particularly, a system is needed which can provide certain services to worksite employers while leveraging its position vis-a-vis the employer to provide key financial services desired by those employees.

BRIEF SUMMARY OF THE INVENTION

The present invention provides systems and methods which overcome the shortcomings of the prior art. In accordance with one aspect of the present invention, methods are provided for administering employee funds and transactions utilizing a personal financial service provider system which allows comprehensive administration of employee accounts.

In accordance with one aspect of the present invention, a system for administering employee funds includes a worksite employer having at least one employee associated therewith; at least one access point configured to interface with said at least one employee; and a personal financial service provider configured to communicate with said worksite employer and said at least one access point, said personal financial service provider including a data center configured to store financial data associated with said at least one employee, wherein said personal financial service provider is configured to receive funds directly from said worksite employer and to disburse said funds to third parties prior to allowing said at least one employee to disburse said funds through said access point.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF PREFERRED EXEMPLARY EMBODIMENTS

Systems and methods in accordance with various aspects of the present invention provide for efficient management of employee funds through the use of a Personal Financial Service Provider (PFSP). As a preliminary matter, the present invention may be described herein in terms of functional block components and various processing steps. It should be appreciated that such functional blocks may be realized by any number of hardware and/or software components configured to perform the specified functions. In addition, those skilled in the art will appreciate that the present invention may be practiced in any number of data communication contexts and that the various systems described herein are merely exemplary applications for various aspects of the invention. Further, it should be noted that the present invention may employ any number of conventional techniques for data transmission, training, signal processing and conditioning, and the like. Such general techniques that are known to those skilled in the art are not described in detail herein.

Figure 1:
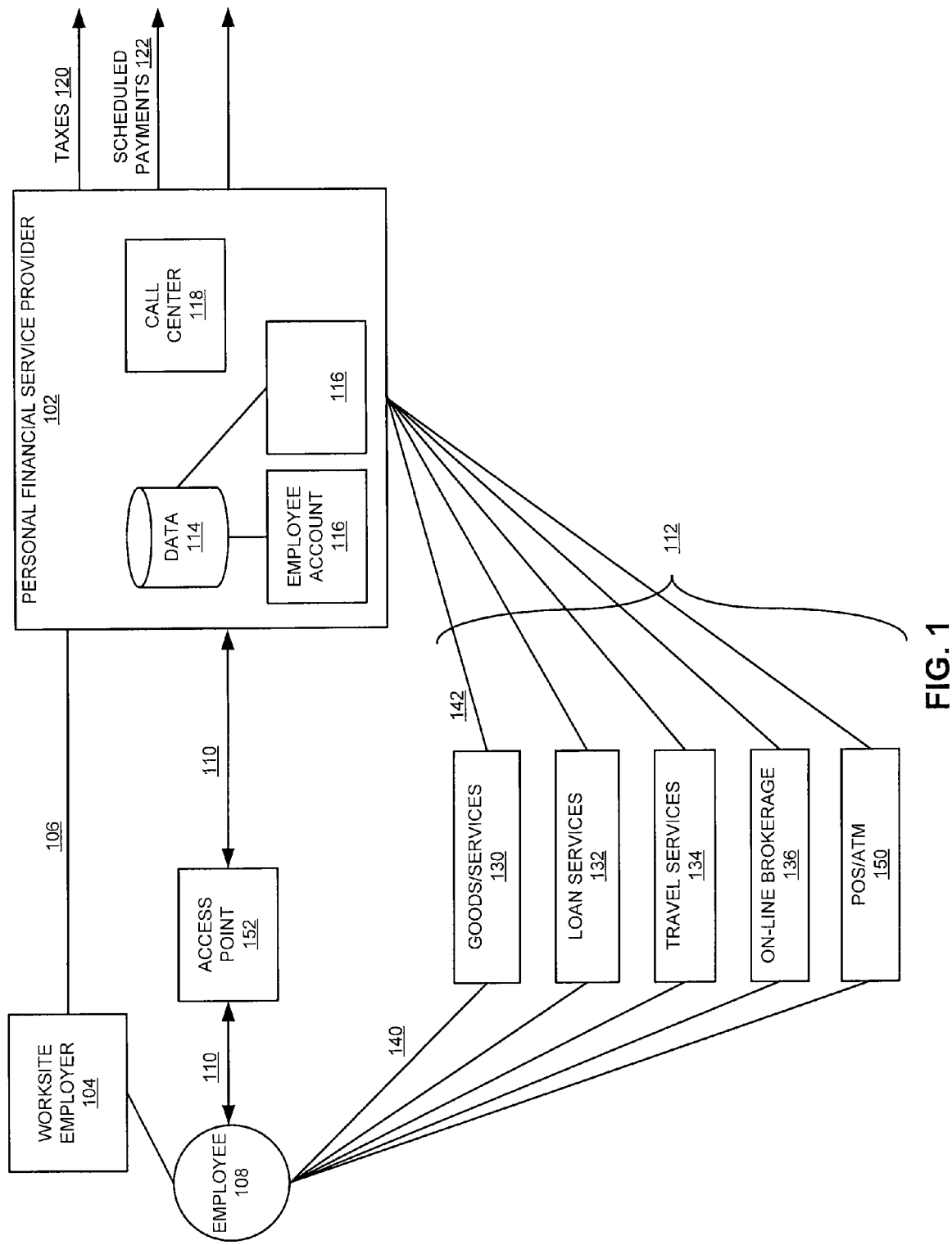
FIG. 1 is a conceptual overview of a system in accordance with the present invention.

Referring now to the conceptual block diagram shown in FIG. 1, a system in accordance with the present invention comprises a Personal Financial Service Provider (PFSP) 102 configured to communicate with a worksite employer 104 and a plurality of employees 108 associated therewith. PFSP 102 preferably includes, inter alia, one or more databases 114 used to administer one or more employee accounts 116 corresponding to employees 108. PFSP 102 preferably also includes a call center 118 for addressing the comments and concerns of employees 108.

For clarity, only one worksite employer 104 is shown in FIG. 1. Those skilled in the art, however, will appreciate that the present system may be scaled to include any number of worksite employers.

One or more third parties 112 may interface with employees 108 and/or PFSP 102 via communication channels 140 and 142, respectively. In this regard, communication channels 110, 140 and 142 may consist of any convenient method of communicating information, e.g., the Internet, a Local Area Network (LAN), a Virtual Private Network (VPN), an intranet connection, an extranet connection, a telephone line, or the like. These communication channels may be wireless, hard-wired, or a combination thereof, and may employ any known or future communication protocol.

Third parties 112 might include a variety of vendors of goods and services 130, loan providers 132, travel services 134, on-line brokerages 136, and the like. The ways in which employees 108 and PFSP 102 might interact with third parties 112 will be described in further detail below; however, in general, PFSP 102 is configured to facilitate convenient payment (via debit or credit) of goods and services provided by third parties 112 as may be sought by employees 108.

In a preferred embodiment, PFSP 102 provides certain unique financial services which augment those services supplied by a conventional bank, combined with the characteristics of what is often referred to as a Professional Employer Organization (PEO). As mentioned above, a PEO is a company that provides integrated business services designed to cost-effectively manage critical human resource responsibilities and employer risks for its clients. PEOs deliver these services by establishing and maintaining an employer relationship with employees 108 assigned to their clients (i.e., worksite employer 104) by contractually assuming substantial employer rights, responsibilities, and risks. Under this contractual arrangement, employment responsibilities are shared or allocated between the PEO and the client, while allowing the client to retain essential management control over the end-product of the work performed by the employees. The PEO assumes responsibility for a wide range of employer responsibilities and risks, pays and reports wages and employment taxes out of its own accounts, and retains rights of direction and control of the employees.

Thus, the client simply writes one check per pay period to cover payroll, taxes, benefits, and administration fees, and the PEO does the rest. The PEO handles unemployment and workers' compensation insurance, as well as any associated claims or audits. The PEO pays the state and federal payroll taxes, processes all of the payroll, and offers employee benefits.

In a preferred embodiment, the client retains all day-to-day management of their work force, and all hiring, training and supervision decisions are retained by the client. Clients simply write one check per pay period. It covers the cost of payroll, workers' compensation and payroll taxes. Administrative workload is reduced significantly, providing the client with more time to focus its resources on more profitable activities.

Thus, in accordance with its PEO aspect, PFSP 102 preferably provides one or more of the following services: Preparation and delivery of payroll checks and any related reports; Preparation and filing of all quarterly and annual federal, state and local tax reports; Preparation of year end W-2 forms; Administration of all direct deposit payroll checks; Administration of any wage garnishments or child support payments; Administration of all payroll deductions; Administration of any employment verification needs; Administration and implementation of all employee tax reporting forms (W-2, A-4, I-9)

In addition, PFSP 102 preferably maintains proper safety and risk management procedures for worksite employer 102, i.e.: Comprehensive safety programs and manuals; Aggressive OSHA compliance programs and inspections to maintain OSHA Guidelines; Reviews of medical billings for all Workers Compensation claims; Back to work programs for injured employees; Drug free workplace programs; Continuous reviews of current government procedures; Communication regarding hazards programs; Prevention programs relating to injury and illness; Emergency workplace planning and procedures; On-site employee safety programs, training and reviews; Accident investigations; Insurance certification processing.

PFSP 102 also preferably provides various employee benefits programs, such as Administration of Group Health Insurance programs; Administration of any voluntary insurance or benefits programs (term life, disability, dental insurances); Administration of 401 k plans; Credit Union membership; Administration of section 125 Cafeteria Plan; Administration and compliance of COBRA; Claims management and insurance follow-up; Information access to benefits coordinators; Insurance company regulation and reporting maintenance according to all local, state and federal guidelines and laws.

The foregoing describes an exemplary list of services provided by PFSP 102 in accordance with its PER aspect. Those skilled in the art will appreciate that PFSP 102 may provide additional services not listed here or may provide only a subset of these services. For more information regarding PEOs, see, e.g., www.dhr.net. Having thus described one aspect of PFSP 102, the funds management component of the present invention will now be described.

Figure 2:
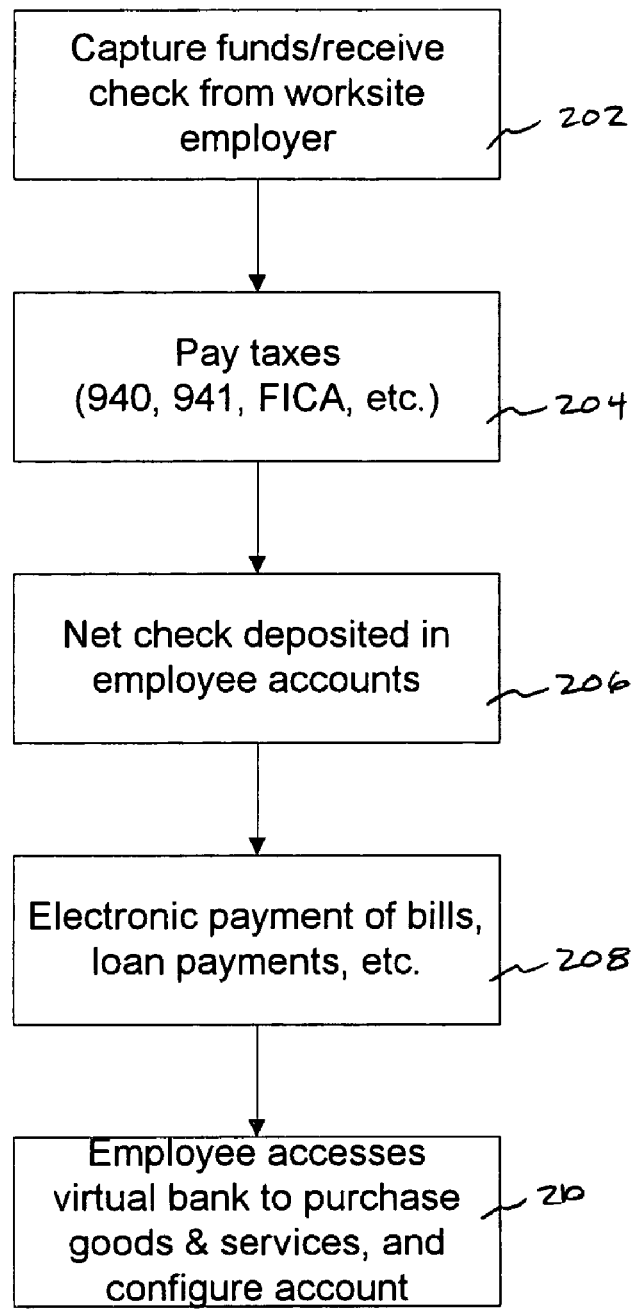
FIG. 2 is simplified a flowchart showing a method in accordance with the present invention.

Referring now to FIGS. 1 and 2, once a month, or at any convenient interval, worksite employer 104 sends funds (via check, electronic transfer, etc.) equal to the gross pay of employees 108 plus any employer taxes (arrow 106, Step 202). PFSP 102 then pays all applicable taxes (Step 204). PFSP extracts a fee for its services which may be arrived at by a variety of methods, for example, as a percentage of gross pay by employee category.

All 940 and 941 taxes are preferably payed on a daily basis. All employee taxes such as FICA, FUTA, SUTA, and the like are also paid (arrow 120). The net check amounts for employees 108 are then deposited in corresponding employee accounts 116 (step 206), where they can be accessed by the employees 108, preferably 24 hours a day (Step 210). The funds are effectively deposited into a "virtual checking account" providing debit function, etc.

PFSP 102 provides for automatic bill payment, or any other type of scheduled payment, depending upon a schedule determined by employee 108. The funds are automatically withdrawn from employee account 116 and disbursed to the corresponding party (arrow 122), which might in fact be one of the third parties 112 (Step 208).

The employee 108 may also purchase goods and service on-line, and pay for those services through a properly configured web site link used in connection with the particular third party 112. The goods may be paid for using a debit transaction, or may be purchased using a pre-approved line of credit determined by PFSP 102.

Loan services (132) can be provided in a timelier matter. As PFSP 102 has information regarding the entire financial profile of employee 108, PFSP can provide for quicker verification. Furthermore, as PFSP 102 is supplied with funds directly from worksite employer 104 (i.e., before Employee 108 can disposition the funds), PFSP 102 is virtually assured payment. With the risk of default thus reduced, PFSP 102 can provide loans, mortgages, credit cards, etc., at very low financing rates.

It will be appreciated that PFSP 102 includes many of the functions of a traditional bank. That is, PFSP 102 keeps track of funds, provides banking services, disperses funds, offers a credit facility, and the like. A bank in accordance with the present invention, however, is available on-line 24 hours a day, and can be configured in accordance with the desired direct payments, prior pre-directs, etc.

As PFSP 102 will typically be associated with a number of different worksite employer's 104, PFSP 102 may allow employees 108 to search for employment with the worksite employers subscribing to PFSP 102. For example, PFSP 102 may have an employment search web site associated therewith which allows job searching capabilities, on-line resumes, and other functionality conventionally associated with job search sites (see, e.g., www.monster.com).

In addition to the "self directed model" described above, the employee may choose to use a "prior pre-direct" model to automatically divert funds from the funds supplied by PFSP 102. Thus, the employee may arrange payment with a vendor of goods and services via a prior pre-direct diversion of funds.

Point-of-sale (POS) and/or Automated Teller Machines (ATM) 150 may also be configured to communicate with PFSP. For example, an employee buying groceries may enter a PIN number or other identification code into a POS terminal, or may present unique biometric data (e.g., fingerprint, retina scan, or the like), such that PFSP 102 authorizes the payment based upon available funds or credit.

A variety of hardware and software platforms may be used to implement the present invention. For example, PFSP may employ Sun hardware, Windows NT servers, and Oracle back-end database systems. These systems may be co-located within a single site, or may distributed over the network at any number of locations.

Employees 108 may interface with PFSP 102 through a variety of means. In a preferred embodiment, PFSP 102 includes one or more web sites configured to provide the employee with an easy-to-use and intuitive graphical user interface. For example, a Web portal design may be employed as shown in FIGS. 3A-3E. In the illustrated embodiment, the graphical user interface is provided by one or more Web pages accessible to the employee over the network. As used herein, the term "Web page" means, generally, information in Hypertext Markup Language format (HTML) transmitted over the network via Hypertext Transport Protocol (HTTP), and displayed by a suitable web browser (e.g., Microsoft Explorer, Netscape Navigator, or the like). Those skilled in the art, however, will realize that the web page itself may include various other client-side and/or server-side elements such as Java applets, Javascript, Active Server Pages (ASP), multimedia components, and the like.

Employees 108 may access PFSP through access point 152, including, for example, personal computers, personal digital assistants (PDAs), stand-alone kiosks, and the like. Furthermore, the present invention may be performed in the context of protocols other than HTML, e.g., Wireless Application Protocol (WAP).

Figure 3A:
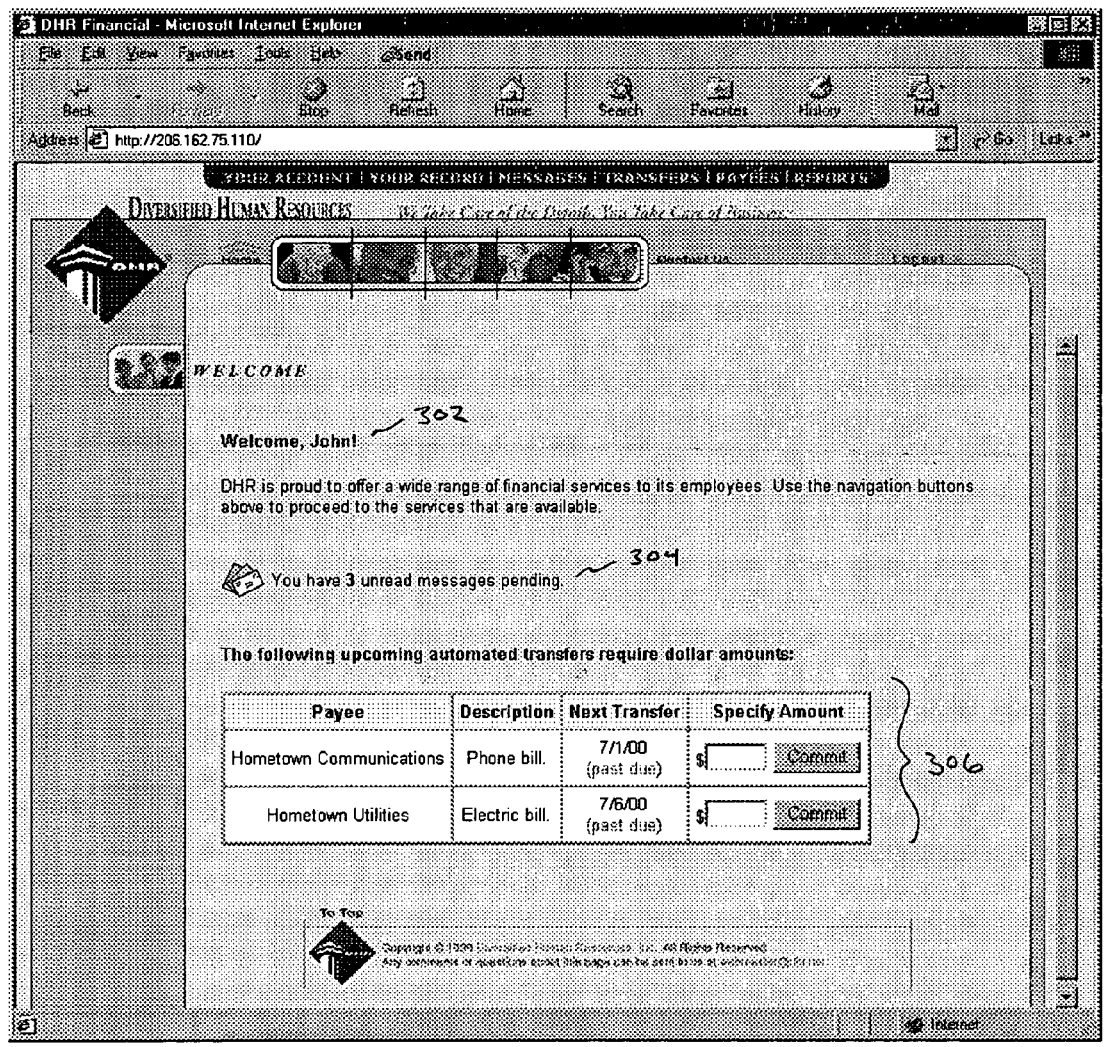
FIGS. 3A-3E depict an exemplary graphical user interface to a system in accordance with the present invention.

FIG. 3A shows an exemplary introductory screen which, in this embodiment, includes a welcome message keyed to the logged-in user (302), a message notification 304, and a region dedicated to show upcoming automated transfers or the like (306). The details of region 306 are described further below.

Figure 3B:
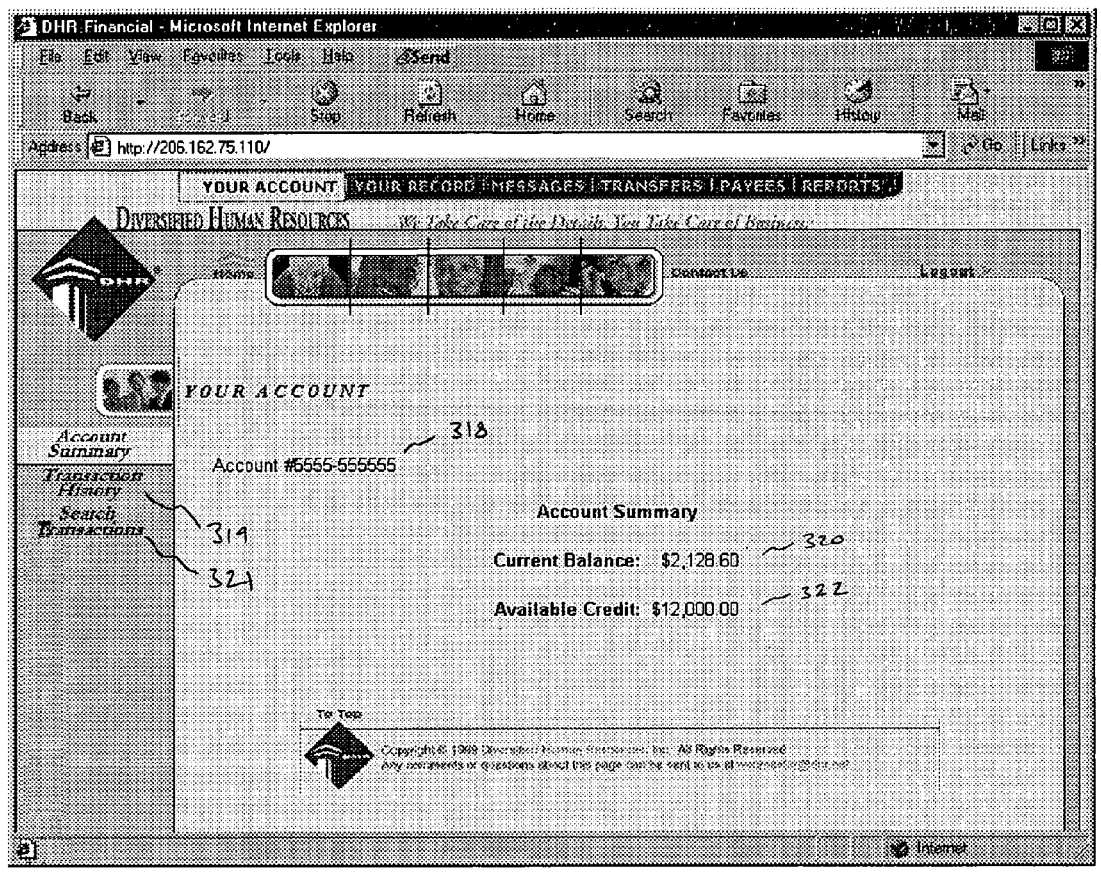

Referring now to FIG. 3B, an account summary screen may be displayed to the user as so. In this embodiment, the system presents account code information (318) and an account summary which specifies the status of various accounts—in this case, the current balance 320 and available credit 322. The user may also access transaction history and/or perform a transaction search through links 319 and 321 respectively.

Figure 3C:
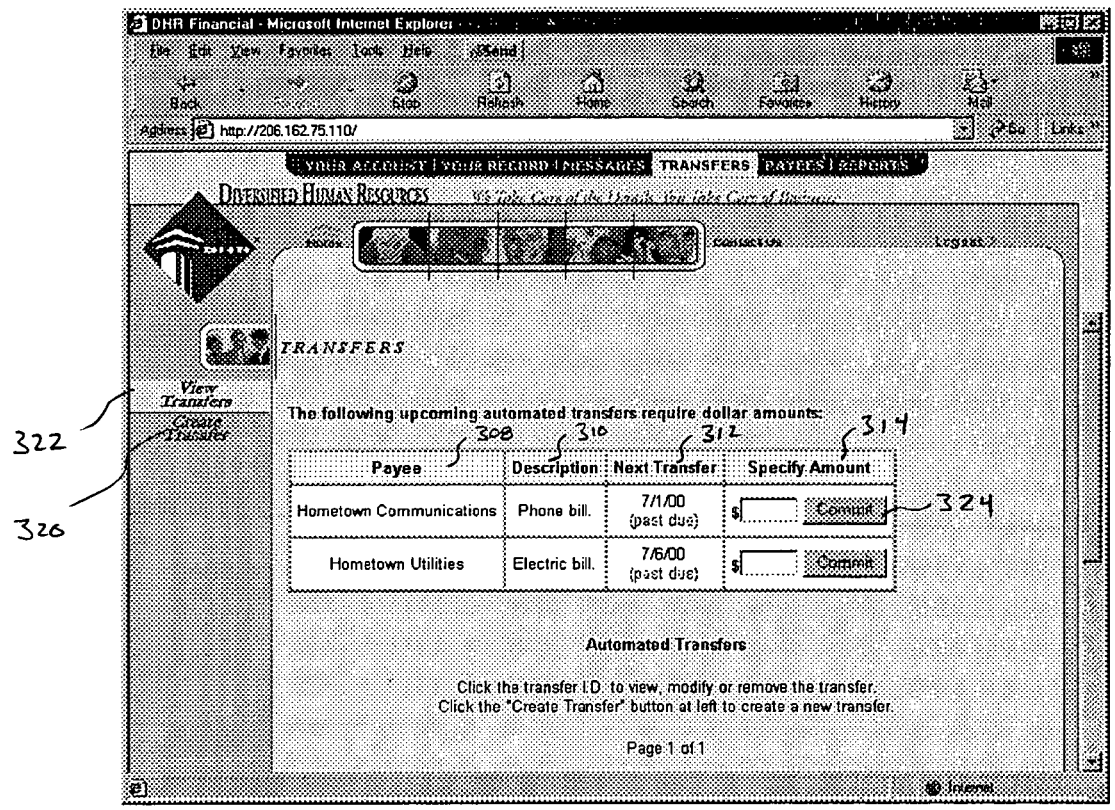

FIG. 3C shows an exemplary screen in which the user may specify automated transfer information. As shown, the user is presented with a matrix which includes the Payee 308, description 310, next transfer date 312, and amount to be transferred 314. The user then may commit to the transfer by pressing button 324, or may modify the displayed information. In order to create new transfer records, the user may click on "Create Transfer" button 320.

Figure 3D:
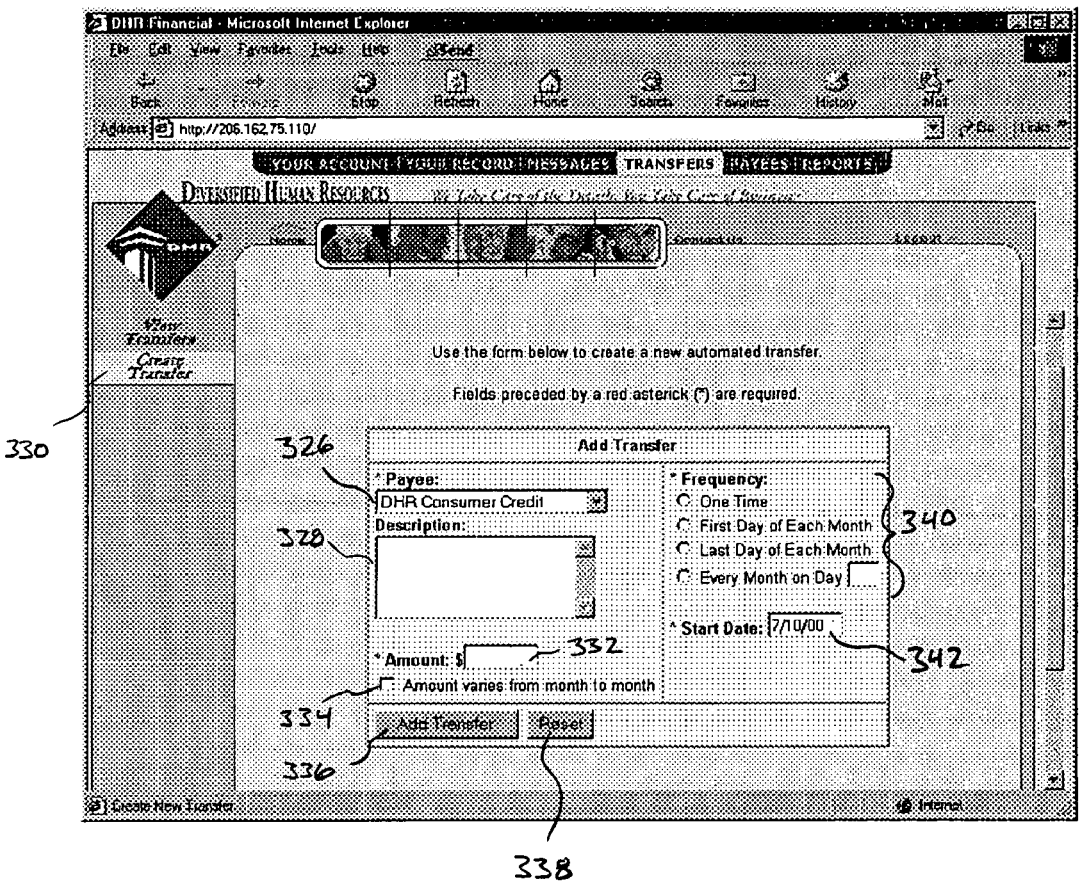

More particularly, referring now to FIG. 3D, the user may create a new transfer by specifying the required information used by the PFSP. In this embodiment, a form is displayed which allows the user to enter the payee name 326, a description 328, an amount to be transferred 332, a checkbox 334 allowing the user to specify whether the amount varies from month to month, a series of radio buttons 340 designating the frequency of transfer (e.g., one time, first of the month, last day of the month, every month on a specific day, etc.), and start date 342 for the transfer.

Figure 3E:
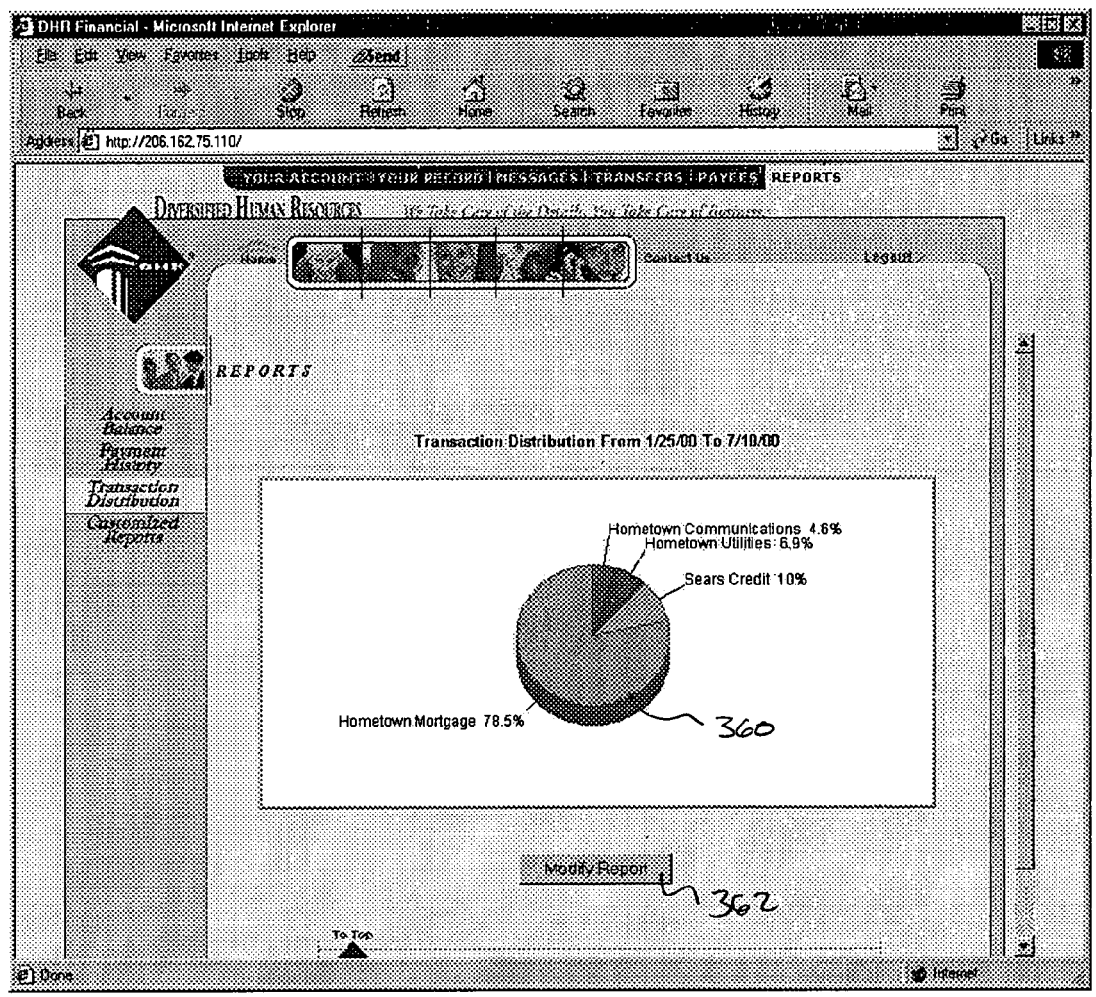

The system preferably allows the user to create standard and custom reports which display various information regarding past account activity. For example, as shown in FIG. 3E, the system may display a pie-chart 360 detailing transaction distributions (e.g., automated transfers) between an arbitrary date range. The user is preferably presented with a button 362 which allows the employee to modify the content and presentation of the data.

It will be appreciated that the illustrated Web interface presents only one possible method of managing the user's (employee's) accounts. Those skilled in the art will realize that the present invention is not so limited, and that a variety of other user interfaces may be employed.

The interface may include additional links to information and preferences which the employee may use to configure and receive information about his accounts. For example, links to configure prior pre-directs, direct payments, and links to various goods and services available on-line, e.g., travel services, brokerage services, loan services, on-line vendors, and employment services.

It should be understood that the exemplary process described may include more or less steps or may be performed in the context of a larger processing scheme. Furthermore, the various flowcharts presented in the drawing figures are not to be construed as limiting the order in which the individual process steps may be performed. Although the invention has been described herein in conjunction with the appended drawings, those skilled in the art will appreciate that the scope of the invention is not so limited. Modifications in the selection, design, and arrangement of the various components and steps discussed herein may be made without departing from the scope of the claimed invention.

I claim:

1. A system for administering employee funds, said system comprising:

a personal financial service provider configured to communicate with a worksite employer and an access point over a network, wherein said access point is configured to interface with an employee, said employee associated with said worksite employer having an obligation to remit said employee funds to said employee, said personal financial service provider including a data center configured to store financial data associated with said employee and configured to calculate a payroll disbursement, wherein said personal financial service provider is configured to electronically receive said employee funds directly from said worksite employer based on said calculated payroll disbursement and configured to electronically disburse an after tax portion of said employee funds to a third party as payment for at least one of a good and service prior to allowing said employee to disburse remaining said employee funds via said access point;

said personal financial service provider configured to electronically receive a fee from said worksite employer, wherein said fee is responsive to said disbursal of said employee funds;

said personal financial service provider configured to interface with said employee to provide at least one of: (a) direct purchase of items from at least one of said third parties, (b) direct purchase of travel services, and (c) direct purchase of investment instruments from at least one of said third parties;

said personal financial service provider configured to administer at least one benefits program associated with said employee.

2. The system of claim 1, wherein said fee is a percentage of a gross payment amount associated with said employee.

3. The system of claim 1, wherein said personal financial service provider pays, for said employee, federal taxes associated with said employee funds.

4. The system of claim 1, wherein said access point includes a Web-based interface.

* * * * *